(12) United States Patent
Lehmann et al.

(10) Patent No.: US 9,249,516 B2
(45) Date of Patent: Feb. 2, 2016

(54) APPLICATION OF OXYGEN SCAVENGERS TO GLYCOL SYSTEMS

(71) Applicants: Marc N. Lehmann, Inglewood (AU); Christopher William Bowman, Ormskirk (GB); Wai Yeung Mok, Manchester (GB); Neil Jonathan Barr, Liverpool (GB)

(72) Inventors: Marc N. Lehmann, Inglewood (AU); Christopher William Bowman, Ormskirk (GB); Wai Yeung Mok, Manchester (GB); Neil Jonathan Barr, Liverpool (GB)

(73) Assignee: BAKER HUGHES INCORPORATED, Houston, TX (US)

(*) Notice: Subject to any disclaimer, the term of this patent is extended or adjusted under 35 U.S.C. 154(b) by 364 days.

(21) Appl. No.: 13/866,674

(22) Filed: Apr. 19, 2013

(65) Prior Publication Data
US 2014/0314620 A1 Oct. 23, 2014

(51) Int. Cl.

| | | |
|---|---|---|
| C23F 11/00 | (2006.01) | |
| C23F 11/04 | (2006.01) | |
| C23F 11/16 | (2006.01) | |
| B08B 9/04 | (2006.01) | |
| C02F 5/02 | (2006.01) | |
| C23F 11/18 | (2006.01) | |
| C23F 11/08 | (2006.01) | |
| C02F 5/08 | (2006.01) | |
| C02F 1/70 | (2006.01) | |
| C02F 5/10 | (2006.01) | |
| C02F 103/36 | (2006.01) | |

(52) U.S. Cl.
CPC ............. *C23F 11/187* (2013.01); *C02F 1/70* (2013.01); *C02F 5/083* (2013.01); *C23F 11/08* (2013.01); *C02F 5/105* (2013.01); *C02F 2103/365* (2013.01); *C02F 2303/08* (2013.01)

(58) Field of Classification Search
CPC ......... A61L 2/00; C23F 11/00; C23F 11/188; B08B 17/00; C02F 5/00
USPC ............... 422/7, 12, 15, 17; 134/8, 22.14; 252/175, 387
See application file for complete search history.

(56) References Cited

U.S. PATENT DOCUMENTS

| | | | |
|---|---|---|---|
| 4,231,894 A | 11/1980 | Lavin et al. | |
| 6,387,461 B1 * | 5/2002 | Ebner et al. | 428/35.7 |
| 6,402,984 B1 | 6/2002 | Nakajima et al. | |

OTHER PUBLICATIONS

Braga, T.G., "Effects of Commonly Used Oilfield Chemicals on the Rate of Oxygen Scavenging by Sulfite/Bisulfite," SPE 13556, pp. 137-142, Society of Petroleum Engineers (May 1987).
Guardian CSC, Oxygen Scavengers: May 2002, pp. 1-6, available online: http://www.guardiancsc.com/pdf/5_02_scavengers.pdf.

* cited by examiner

*Primary Examiner* — Monzer R Chorbaji
(74) *Attorney, Agent, or Firm* — Mossman Kumar & Tyler PC

(57) ABSTRACT

An oxygen scavenger composition is effective in reducing oxygen-induced corrosion in aqueous systems that contain water, oxygen and a significant proportion (at least about 20 wt %) of a glycol, such as monoethylene glycol (MEG). The oxygen scavenger composition contains a sulfite, a transition metal salt, and a stabilizer to enhance the kinetics of oxygen removal (scavenging). The oxygen scavenger composition is particularly suitable when the transition metal salt component includes at least two different transition metals together, such as Ni and Co, or Ni and Mn.

17 Claims, No Drawings

APPLICATION OF OXYGEN SCAVENGERS TO GLYCOL SYSTEMS

TECHNICAL FIELD

The invention relates to methods and compositions for inhibiting oxygen-induced corrosion, and, in one aspect, more particularly relates to oxygen scavenger compositions and methods for using them in systems having glycols present.

TECHNICAL BACKGROUND

It is well known that when impure iron (e.g. cast iron) is in contact with water, dissolved oxygen or other strong oxidants (or acids) it rusts. Iron metal is relatively unaffected by pure water or by dry oxygen. As with other metals, like aluminum, a tightly adhering oxide coating, a passivation layer, protects the bulk iron from further oxidation. The conversion of the passivating ferrous oxide layer to rust results from the combined action of two agents, usually oxygen and water. However, other degrading solutions such as those of sulfur dioxide and/or carbon dioxide in water create corrosive conditions where iron hydroxide species are formed. Unlike ferrous oxides, the hydroxides do not adhere to the bulk metal; as they form and flake off, fresh iron is exposed and the cycle is repeated.

The rusting of iron is an electrochemical process that begins with the transfer of electrons from iron to oxygen. The rate of corrosion is affected by water and accelerated by electrolytes, such as those from salts present. The key reaction is the reduction of oxygen (i.e. molecular oxygen $O_2$). Therefore one approach to reducing and/or preventing corrosion of metals, particularly those containing iron, in contact with water and oxygen is to "scavenge" or bind up the oxygen before it has a chance to oxidize the iron.

While mechanical deaeration of water is an important step, in many systems and processes, mechanical deaeration is followed by chemical deaeration in order to remove (bind up or otherwise scavenge) the last traces of dissolved oxygen. Where mechanical deaeration is not employed, chemical deaeration must be used for the removal of the entire oxygen content of the aqueous system.

Sodium sulfite and sodium bisulfite are chemical agents commonly used for scavenging oxygen, in non-limiting instances, oilfield production systems, such as from produced water systems or water injection systems to reduce the potential for oxygen-induced corrosion. However in the presence of glycols, the oxygen removal reactions become challenged by glycols that act to terminate the chain reactions and prevent oxygen removal. Thus, glycols interfere with the use of sulfites as oxygen scavengers.

It would be advantageous if new oxygen scavenger compositions were discovered or developed that could be used in aqueous systems where glycol is present.

SUMMARY

There is provided, in one non-limiting embodiment, a method to reduce oxygen-induced corrosion in an aqueous system, where the method involves contacting the aqueous system with an effective amount of an oxygen scavenger composition to reduce oxygen-induced corrosion therein. The aqueous system includes water, oxygen and a glycol, where the oxygen scavenger composition includes at least one sulfite compound, at least one transition metal salt and at least one stabilizer. The transition metal salt includes, but is not necessarily limited to a chloride salt and/or a sulfate salt. The transition metal ion of the salt includes, but is not necessarily limited to nickel, cobalt, and/or manganese. The stabilizer includes, but is not necessarily limited to, citric acid, ethylenediaminetetracetic acid, glycolic acid, acetic acid, ethylene diamine, N,N-diethylethylenediamine, and/or diethylene triamine and salts of these stabilizers. Finally, the method also involves reducing oxygen-induced corrosion in the aqueous system by scavenging oxygen with the oxygen scavenger composition.

Further in another non-restrictive version, there is provided an aqueous system that includes water, oxygen, a glycol; and an effective amount of an oxygen scavenger composition. The oxygen scavenger composition includes at least one sulfite compound, at least one transition metal salt and at least one stabilizer. Suitable sulfite compounds, transition metal salts and stabilizers are those previously described. The oxygen-induced corrosion of the aqueous system is reduced as compared to an identical aqueous system absent the oxygen scavenger composition.

There is additionally provided, in other non-limiting embodiments, an oxygen scavenger composition per se having at least one sulfite compound, at least one transition metal salt and at least one stabilizer. Suitable sulfite compounds, transition metal salts and stabilizers are those previously described.

DETAILED DESCRIPTION

Catalysts and stabilizers have been discovered that may be added to the oxygen scavenger formulations to enhance the kinetics of oxygen removal and to inhibit or prevent glycol present from challenging and interfering with the oxygen removal and/or scavenging reactions.

As noted, oxygen scavengers such as sulfite ions are commonly used for scavenging oxygen in oilfield production systems to remove oxygen from produced water systems or water injection systems, or in boiler systems using water or other aqueous systems. However in the presence of glycol, dissolved oxygen removal reactions become challenged by competitive reactions involving the alcohol groups on the glycol or polyol that act to terminate the chain reactions, and prevent oxygen removal. To overcome these reactions, new catalysts and stabilizers have been discovered that can be added to the oxygen scavenger formulations to enhance the kinetics of oxygen removal.

The catalysts involving metals such as nickel and cobalt are known to have been used separately in conjunction with oxygen scavenger formulations containing sodium sulfite, ammonium sulfite and sodium meta-bisulfite to aid in the kinetics of oxygen removal, however these catalysts were found to be ineffective in scavenging oxygen from solutions containing more than 70 wt % monoethylene glycol (MEG) and perhaps less in other aqueous solutions.

Instead it has been discovered that a specific mixture or combination of metal ions were found to be needed to activate or aid in catalysis of the reactions involved in removing dissolved oxygen. These mixtures involved transition metal salts comprising combinations of nickel and cobalt ions, as well as nickel and manganese ions. These metal ions were added to the formulation as their chloride or sulfate salts. Furthermore, the metal ions were found not to have long term stability in the formulations and were discovered to precipitate if a specific type of stabilizer was not added to the formulation. Stabilizers included citric acid and EDTA and their respective salts. Suitable salts of these stabilizers include, but are not necessarily limited to, sodium, potassium and ammonium salts.

More particularly, the aqueous systems that may be treated with the oxygen scavenger compositions are those which include water, oxygen (e.g. dissolved molecular oxygen), and at least one glycol. Expected glycols include monoethylene glycol (MEG), diethylene glycol (DEG), triethylene glycol (TEG) and combinations thereof. The proportion of glycol in the aqueous system may range from about 20 independently to about 100 wt %; alternatively from about 40 independently to about 100 wt %; and in another non-limiting embodiment from about 65 independently to about 100 wt %. The term "independently" as used herein with respect to a parameter range means that any lower threshold may be combined with any upper threshold to form a suitable alternative range.

In the oxygen scavenger composition, suitable sulfites include, but are not necessarily limited to, sodium sulfite, sodium bisulfite, ammonium sulfite, ammonium bisulfite, sodium meta-bisulfite, potassium sulfite, potassium bisulfite, potassium meta-bisulfite, calcium sulfite, calcium hydrogen sulfite and combinations thereof.

Suitable transition metal salts in the oxygen scavenger composition include chloride salts, sulfate salts and combinations thereof. Suitable transitional metals in the transition metal salt include, but are not necessarily limited to, nickel, cobalt, manganese and combinations thereof. In one non-limiting embodiment, at least two transition metal salts are used together in a pair. Suitable pairs include, but are not necessarily limited to, a nickel salt and a cobalt salt, and a nickel salt and a manganese salt.

Suitable stabilizers for use in the oxygen scavenger composition include, but are not necessarily limited to citric acid, ethylenediaminetetracetic acid (EDTA), glycolic acid, acetic acid, ethylene diamine (EDA), N,N-diethylethylenediamine, diethylene triamine (DETA), and salts of these stabilizers and combinations of these stabilizers and salts thereof.

In one non-limiting embodiment, the proportions of the components in the in the oxygen scavenger composition include from about 1 independently to about 40 wt % of sulfite compound; from about 0.1 independently to about 3 wt % of transition metal salt; and from about 0.1 independently to about 5 wt % of stabilizer. Alternatively, the proportions of the components in the in the oxygen scavenger composition include from about 10 independently to about 30 wt % of sulfite compound; from about 0.5 independently to about 2 wt % of transition metal salt; and from about 0.5 independently to about 2 wt % of stabilizer. The balance of the oxygen scavenger composition is an aqueous solvent, most typically water.

The effective amount of the oxygen scavenger composition ranges from about 10 ppm independently to about 4000 ppm, based on the aqueous system; alternatively from about 10 ppm independently to about 2000 ppm; and in another non-limiting embodiment from about 10 ppm independently to about 200 ppm.

The oxygen scavenger formulations may be added to lean glycol systems(greater than 60-70 wt % glycol in one non-limiting embodiment) either alone or as an additive in combination with scale and corrosion inhibitors and biocides, or other conventional additives. The oxygen scavenger formulations may be applied to remove oxygen in a process stream containing glycols or added to a tank containing glycols to remove oxygen during storage or transport. In addition the scavenger can be applied either upstream or downstream of glycol regeneration or reclamation processes. There is no particular technique or method that is especially suitable for adding the oxygen scavenger compositions. The oxygen scavenger compositions are expected to work over a wide range of temperatures, pressures and other conditions. However, in some applications, such as when the oxygen scavenger composition is present in MEG systems introduced via umbilicals to subsea equipment, in a non-restrictive instance, they do not precipitate when heated to high temperatures (defined herein as about 170° C. or above).

For the compositions and methods described herein, it is not necessary that all of the free oxygen be scavenged from an aqueous system for the composition or method to be considered successful. Of course, complete scavenging of the free oxygen is a worthwhile goal. Indeed, the compositions and methods are considered successful if oxygen-induced corrosion in the aqueous system is reduced as compared with an otherwise identical composition or method absent the at least one stabilizer.

The invention will now be described with respect to particular Examples that are not intended to limit the invention but simply to illustrate it further in various non-limiting embodiments. Unless otherwise noted, all percentages (%) are weight %, and all dosages are ppm by volume.

Formulations 1 and 2

General formulations included the following:

Formulation 1

36.38% sodium meta-bisulfite 61.94% (distilled/deionized) water 1.00% Citric acid 0.34% $CoCl_2.6H_2O$ (50% solution)

0.34% $NiSO_4.6H_2O$ (50% solution)

Formulation 2

30% sodium meta-bisulfite

1% $MnCl_2$ (50% Solution)

1% Citric acid

68% distilled/deionized water

The formulations are designed so that when they are heated to high temperatures (170° C. or above) at applied treatment rates (100 to 2000 ppm) in lean MEG systems the products do not cause precipitation. This is particularly important in the situation where the final MEG is delivered via umbilicals to well systems and any solids could plug the umbilicals or check valves. However, it is fully expected that the oxygen scavenger compositions may be delivered via other methods.

EXAMPLES A-D

Table I presents the results of using the oxygen scavenger compositions of Formulations 1 and 2 in treatment concentrations of 2,500 ppm and 600 ppm to reduce parts per million (ppm) initial levels of dissolved oxygen to parts per billion (ppb) levels of residual oxygen. It may be seen that both formulations in all Examples successfully reduced the dissolved oxygen in all Examples.

TABLE I

Fluid 80% MEG 20% Brine (pH Adjusted Using MDEA)

| Oxygen Scavenger | Treatment Concen. (ppm) | pH | Initial Dissolved $O_2$ Level (ppm) | Residual Oxygen After Treatment (ppb) | Time (min.) |
|---|---|---|---|---|---|
| Formulation 1 | 2,500 | 7 | 1 | 20 | 200 |
| Formulation 1 | 600 | 9.5 | 1 | <10 | 80 |
| Formulation 2 | 2000 | 7 | 1 | 2 | >200 |
| Formulation 2 | 600 | 9.5 | 1.5 | 6 | 90 |

Many modifications may be made in the present invention without departing from the spirit and scope thereof that are defined only by the appended claims. For example, certain components per se, or combinations of components thereof other than those specifically set out herein may be found by one of routine skill in the art to be particularly advantageous, e.g. different combinations of sulfate compounds, transition metal salts, stabilizers and salts thereof, etc. other than those explicitly mentioned or exemplified are expected to be useful.

The words "comprising" and "comprises" as used throughout the claims is interpreted "including but not limited to".

The present invention may suitably comprise, consist or consist essentially of the elements disclosed and may be practiced in the absence of an element not disclosed. For instance, in one non-limiting embodiment, a method to reduce oxygen-induced corrosion in an aqueous system may consist essentially of or consist of the oxygen scavenger composition recited in the claims. Further, a treated aqueous system may consist essentially of or consist of water, oxygen, one or more glycols and an effective amount of an oxygen scavenger composition as defined by the claims.

Alternatively, the transition metal salt may consist essentially of or consist of a transition metal ion selected from the group consisting of nickel, cobalt, manganese and combinations thereof.

In another non-limiting embodiment, the oxygen scavenger composition may consist essentially of or consist of at least one sulfite compound, at least one transition metal salt selected from the group consisting of chloride salts, sulfate salts and combinations thereof, where the transition metal ion is selected from the group consisting of nickel, cobalt, manganese and combinations thereof, and at least one stabilizer selected from the group consisting of citric acid, ethylenediaminetetracetic acid, glycolic acid, acetic acid, ethylene diamine, N,N-diethylethylenediamine, diethylene triamine, and salts of these stabilizers combinations of these stabilizers and salts thereof.

What is claimed is:

1. A method to reduce oxygen-induced corrosion in an aqueous system comprising:
    contacting the aqueous system comprising water, oxygen and a glycol with an effective amount of an oxygen scavenger composition to reduce oxygen-induced corrosion therein, the oxygen scavenger composition comprising:
        at least one sulfite compound selected from the group consisting of sodium sulfite, sodium bisulfite, ammonium sulfite, ammonium bisulfite, sodium meta-bisulfite, potassium sulfite, potassium bisulfite, potassium meta-bisulfite, calcium sulfite, calcium hydrogen sulfite, and combinations thereof,
        at least one transition metal salt selected from the group consisting of chloride salts, sulfate salts and combinations thereof, where the transition metal salt comprises a transition metal ion selected from the group consisting of nickel, cobalt, manganese and combinations thereof, and
        at least one stabilizer selected from the group consisting of citric acid, ethylenediaminetetracetic acid, glycolic acid, acetic acid, ethylene diamine, N,N-diethylethylenediamine, diethylene triamine, and salts of these stabilizers, and combinations of these stabilizers and salts thereof; and
    reducing oxygen-induced corrosion in the aqueous system by scavenging oxygen with the oxygen scavenger composition.

2. The method of claim 1 where in the oxygen scavenger composition:
    the proportion of sulfite compound ranges from about 1 to about 40 wt %;
    the proportion of transition metal salt ranges from about 0.1 to about 3 wt %; and
    the proportion of stabilizer ranges from about 0.1 to about 5 wt %.

3. The method of claim 1 where the transition metal salt includes at least two transition metal salts in a pair selected from the group consisting of:
    a nickel salt and a cobalt salt, and
    a nickel salt and a manganese salt, and
    combinations thereof.

4. The method of claim 1 where in the aqueous system the proportion of glycol ranges from about 20 to about 100 wt %.

5. The method of claim 1 where in the aqueous system the glycol is selected from the group consisting of monoethylene glycol, diethylene glycol, triethylene glycol, and combinations thereof.

6. The method of claim 1 where the effective amount of the oxygen scavenger composition ranges from about 10 to about 4000 ppm, based on the aqueous system.

7. The method of claim 1 where the aqueous system is selected from the group consisting of oilfield produced water systems and oilfield water injection systems and where the aqueous system is in contact with iron.

8. A treated aqueous system comprising:
    water;
    oxygen;
    at least one glycol; and
    an effective amount of an oxygen scavenger composition to reduce oxygen-induced corrosion when the aqueous system contacts iron, the oxygen scavenger composition comprising:
        at least one sulfite compound selected from the group consisting of sodium sulfite, sodium bisulfite, ammonium sulfite, ammonium bisulfite, sodium meta-bisulfite, potassium sulfite, potassium bisulfite, potassium meta-bisulfite, calcium sulfite, calcium hydrogen sulfite, and combinations thereof,
        at least one transition metal salt selected from the group consisting of chloride salts, sulfate salts and combinations thereof, where the transition metal salt comprises a transition metal ion selected from the group consisting of nickel, cobalt, manganese, and combinations thereof, and
        at least one stabilizer selected from the group consisting of citric acid, ethylenediaminetetracetic acid, glycolic acid, acetic acid, ethylene diamine, N,N-diethylethylenediamine, diethylene triamine, and salts of these stabilizers, and combinations of these stabilizers and salts thereof;

where the oxygen-induced corrosion of the aqueous system is reduced as compared to an identical aqueous system absent the oxygen scavenger composition.

9. The aqueous system of claim 8 where in the oxygen scavenger composition:
the proportion of sulfite compound ranges from about 1 to about 40 wt %;
the proportion of transition metal salt ranges from about 0.1 to about 3 wt %; and
the proportion of stabilizer ranges from about 0.1 to about 5 wt %.

10. The aqueous system of claim 8 where the transition metal salt includes at least two transition metal salts in a pair selected from the group consisting of:
a nickel salt and a cobalt salt, and
a nickel salt and a manganese salt, and
combinations thereof.

11. The aqueous system of claim 8 where in the aqueous system the proportion of glycol ranges from about 20 to about 100 wt %.

12. The aqueous system of claim 8 where the at least one glycol is selected from the group consisting of monoethylene glycol, diethylene glycol, triethylene glycol, and combinations thereof.

13. The aqueous system of claim 8 where the effective amount of the oxygen scavenger composition ranges from about 10 to about 4000, based on the aqueous system.

14. The aqueous system of claim 8 where the aqueous system is selected from the group consisting of oilfield produced water systems and oilfield water injection systems.

15. An oxygen scavenger composition comprising:
at least one sulfite compound selected from the group consisting of sodium sulfite, sodium bisulfite, ammonium sulfite, ammonium bisulfite, sodium meta-bisulfite, potassium sulfite, potassium bisulfite, potassium meta-bisulfite, calcium sulfite, calcium hydrogen sulfite, and combinations thereof,
at least one transition metal salt selected from the group consisting of chloride salts, sulfate salts and combinations thereof, where the transition metal salt comprises a transition metal ion selected from the group consisting of nickel, cobalt, manganese, and combinations thereof, and
at least one stabilizer selected from the group consisting of citric acid, ethylenediaminetetracetic acid, glycolic acid, acetic acid, ethylene diamine, N,N-diethylethylenediamine, diethylene triamine, salts of these stabilizers and combinations of these stabilizers and salts thereof.

16. The oxygen scavenger composition of claim 15 where:
the proportion of sulfite compound ranges from about 1 to about 40 wt %;
the proportion of transition metal salt ranges from about 0.1 to about 3 wt %; and
the proportion of stabilizer ranges from about 0.1 to about 5 wt %.

17. The oxygen scavenger composition of claim 15 where the transition metal salt includes at least two transition metal salts in a pair selected from the group consisting of:
a nickel salt and a cobalt salt, and
a nickel salt and a manganese salt, and
combinations thereof.

* * * * *